Figure 1:
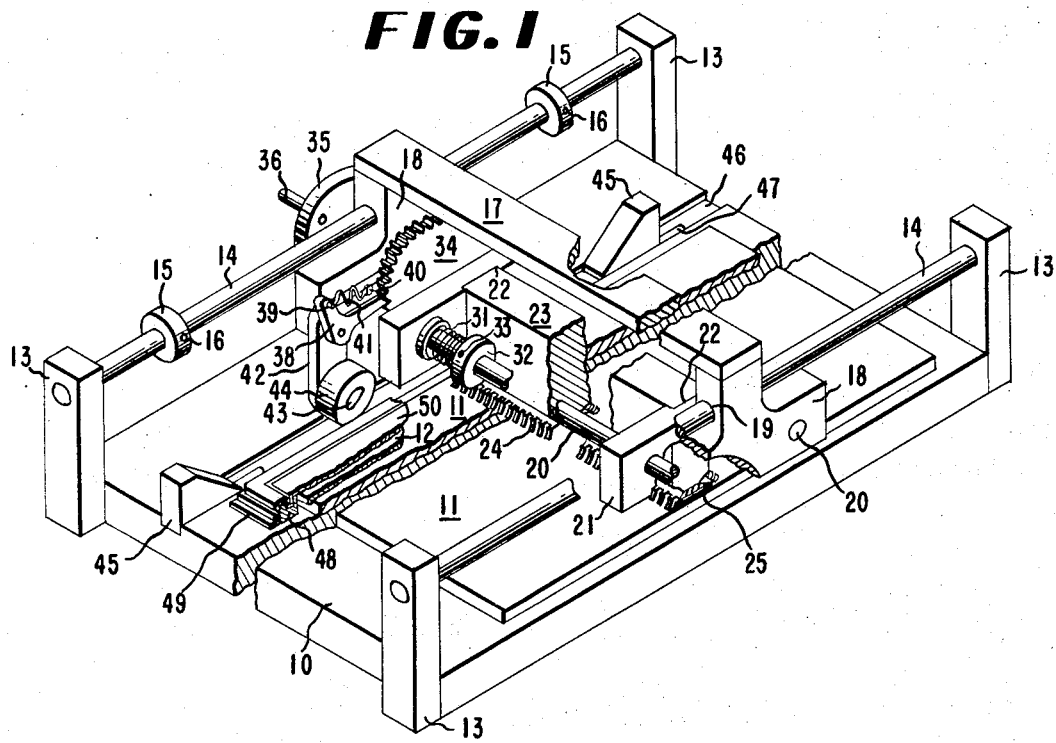

Oct. 10, 1967  C. L. LONG  3,346,679
MACHINE FOR FORMING IMAGES
Filed March 31, 1964  3 Sheets-Sheet 1

INVENTOR
CECIL LOUIS LONG
BY Lynn Barratt Morris
ATTORNEY

Oct. 10, 1967     C. L. LONG     3,346,679

MACHINE FOR FORMING IMAGES

Filed March 31, 1964     3 Sheets-Sheet 2

INVENTOR
CECIL LOUIS LONG

BY *Lynn Barratt Morris*

ATTORNEY

INVENTOR
CECIL LOUIS LONG

United States Patent Office 3,346,679
Patented Oct. 10, 1967

3,346,679
MACHINE FOR FORMING IMAGES
Cecil Louis Long, Westfield, N.J., assignor to E. I. du Pont de Nemours and Company, Wilmington, Del., a corporation of Delaware
Filed Mar. 31, 1964, Ser. No. 356,319
5 Claims. (Cl. 264—340)

This invention relates to an improved process for forming clear or light-transmitting images in an opaque pressure-clearable film. The invention also relates to an improved machine for forming non-distorted clear or stencil images in opaque pressure-clearable films.

In Bechtold U.S. Patent 2,957,791, processes are described for selectively clarifying the opaque, pressure-clearable films covered by said patent that include pressing the films against a copper engraving, and placing the film in a typewriter, without an inking ribbon, and typing directly on it. The pressure-clearable films can be placed against type in a proofing press, and the roller passed over the type to produce a clear image of the type in the film. The resultant clear image-bearing elements can then be used as negatives for photoprinting.

Effective and durable machines for selectively clarifying these films have been devised and are disclosed assignee's pending U.S. patent applications Alles, Ser. No. 189,891 filed Apr. 24, 1962, and Alles, Ser. No. 257,053 filed Feb. 5, 1963, U.S. Patents 3,128,498 and 3,128,497, respectively, patented Apr. 14, 1964.

These machines have a bedplate adapted to support a relief printing form and an opaque, pressure-clearable film in contact with the relief surface of the form. There is a frame member mounted above and suspended across the bedplate supporting the printing form and adapted to hold a multiplicity of spring fingers of small coactive area in contact with the upper surface of the film and press the pressure-clearable surface against the relief surface. Also, there are reciprocating means for allowing relative motion of the plate support and the frame member bearing the spring fingers to subject the film to a stroking pressure from the fingers during the motion. Additionally, the machines are provided with means for changing the position of the spring fingers laterally by a predetermined amount to insure overlapping and uniform coverage of the whole surface of the film and underlying type form. Preferably, the machines are provided with a vacuum frame about the form and adapted to hold the pressure-sensitive film in contact with the surface of the relief.

The improved machine that is described in Alles Ser. No. 257,053 filed Feb. 5, 1963 (U.S. Patent 3,128,497) is characterized in that the transverse support block or member for the yieldable or spring fingers is pivotally mounted, so that it can be tilted about a transverse axis to vary the position of contacting surfaces of the row of fingers above the bed-plate or from film contact position.

During the use of these machines, it has been observed that straight forward indexing, i.e., having each successive straight line tracing of the fingers on the film slightly overlap the previous tracing until all the area is clarified, distorts the highlight dot images in a repeat pattern corresponding to the finger spacing. These highlight dot images are reproduced from the relief surface of all types of mounted, metal halftone plates, e.g., zinc, copper, magnesium, etc. plates. The image distortion appears as elongations in the direction of the indexing travel, i.e., perpendicular to the line of finger travel.

The cause of the distortion is not exactly known, but it is believed to be related to the movement of the conversion film with respect to the relief surface in the direction of carriage indexing. This belief is based on the observation that the discrepancy in dot fidelity occurs at intervals corresponding to the finger spacing. The sidewise film movement is thought to be produced by the thrust or accumulation of thrusts of the previous strokes of the fingers.

Therefore, it is an object of this invention to provide an improved process for obtaining clear, undistorted images in opaque, pressure-clearable film. A more specific object is to provide such a process for obtaining stencil or clear images that are free from highlight dot distortion and streaks. Another object is to provide a process for obtaining clear image reproductions in such a film when reproducing halftone reliefs. A further object is to provide a machine to carry out the process of the invention. A still further object is to provide such machines which are simple in construction, easy to operate and give uniform, dependable results. A still further object is to provide such machines which can be manufactured economically.

These and other objects, which will be apparent from the following description, are accomplished in accordance with the invention.

In the process of this invention for forming clear images in an opaque pressure-clearable film which comprises maintaining in contact with the relief surface of a printing form the pressure-sensitive surface of a thin, flexible sheet embodying a stratum of opaque, pressure-clearable material while subjecting the opposite surface of the sheet simultaneously to a unit of equally spaced pressure strokes to form a unit of spaced pressure traces and consecutively applying the unit of pressure strokes until the entire desired relief area has been subjected to at least one pressure stroke, the improvement is characterized by shifting laterally a plurality of times (e.g. 4 to 16 times) in either direction the successive unit so that the pressure traces are displaced from each other farther than the tracing width, and then applying additional unit strokes to complete pressure tracing of the entire desired relief area.

The cycle of laterally shifting the unit of pressure strokes can be repeated in either the same or a different distance of lateral shifting or in overlapping tracing strokes so that the entire surface of the relief can be subjected to pressure tracing 1 to 3 times. This will insure equal density of the densified material in the clear image areas of the pressure-sensitive stratum.

An improved image-forming machine of this invention having—
(A) A bedplate adapted to support a relief printing form and an opaque, pressure-clearable film in contact with its relief surface,
(B) A frame member mounted above and suspended across the bedplate,
(C) At least one row of yieldable fingers of small coactive area held by said frame member and adapted to contact with the upper surface of such a film and press the film against the relief surface of said form,
(D) Means providing relative motion between the bedplate and frame member to subject the film to a stroking pressure from said fingers during the motion, and
(E) Means for laterally adjusting the position of the yieldable fingers with respect to the relief form; characterized in that the last-mentioned means includes an indexing mechanism for indexing linear stroke motion between the bedplate and frame member so that the consecutive strokes of the fingers in said row are essentially displaced laterally from each other a distance farther than the tracing width for a plurality of times (e.g. 4 to 16 times).

The indexing mechanism can include a ratchet wheel, indexing pawls, and an escapement wheel.

In the machines just defined there can be at least one row of yieldable fingers and another row of such fingers with small coactive areas offset from those of the first row. Also, the transverse support member can be pivotally mounted on the frame member whereby the support member can be tilted about a transverse axis to raise one row of fingers from contact position.

While the process just described is not limited to any particular apparatus, a simple and reliable machine having the characteristic feature just described is disclosed in the following description and the accompanying drawings.

Figure 2:
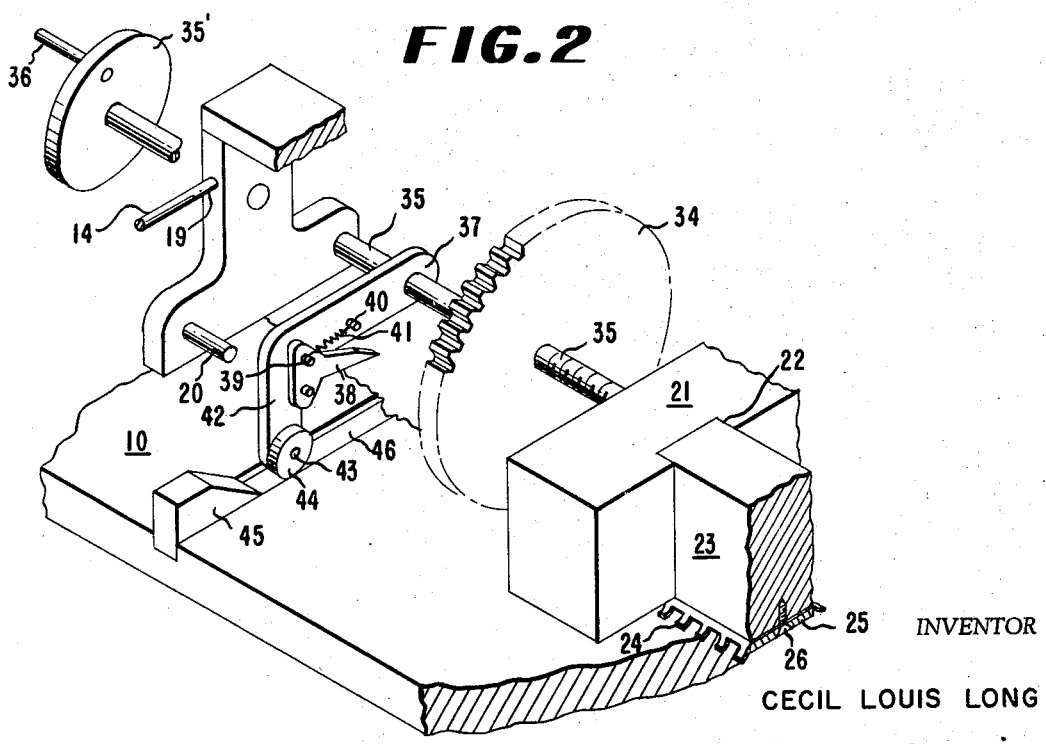
Figure 3:
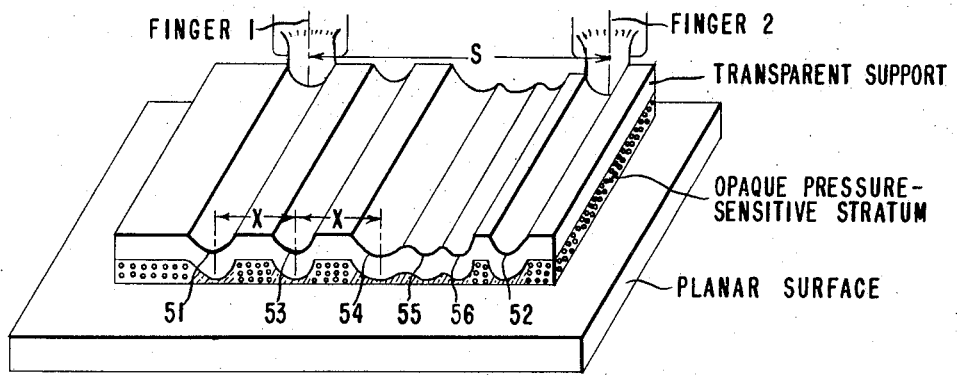
Figure 4:
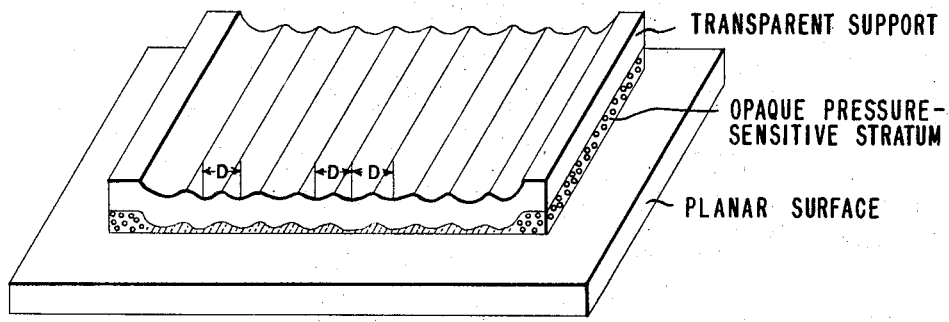
Figure 5:
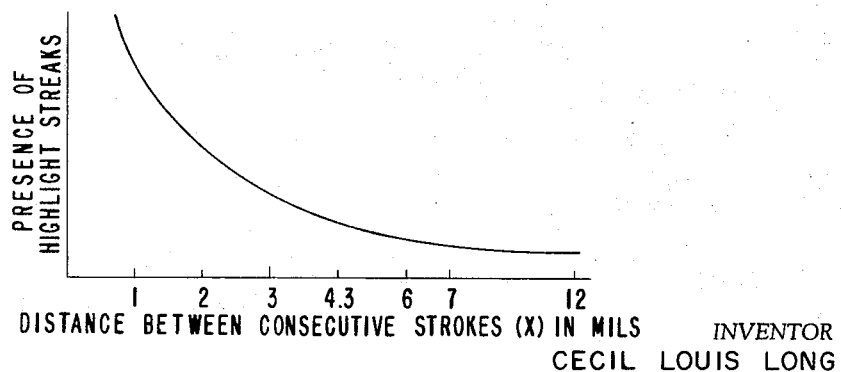
Figure 6:
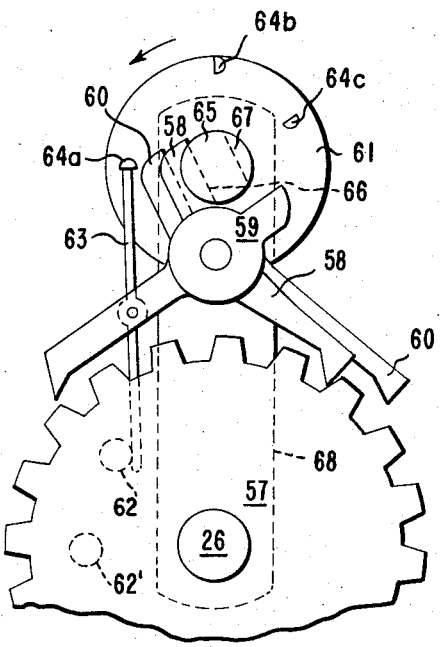
Figure 7:
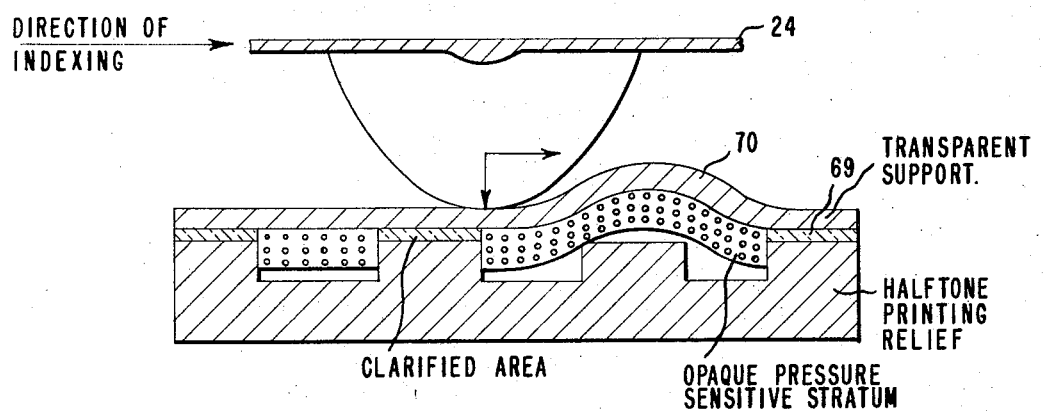

The invention will now be described with reference to the drawings which constitute a part of this application. In the drawings:

FIG. 1 is an isometric view of one form of machine with a printing form in place and parts in broken-away construction, FIG. 2 is an exploded, isometric view of the indexing mechanism of the machine of FIG. 1 with parts in section, FIG. 3 is an isometric view of a partially clarified opaque-pressure-clearable film, FIG. 4 is an isometric view of a clarified opaque-pressure-clearable film, FIG. 5 is a curve representing the relationship between highlight streaks and the distance between consecutive strokes, FIG. 6 is a side elevation of a reciprocating shifting or indexing mechanism, and FIG. 7 is an enlarged section in elevation of a portion of a halftone relief, pressure-sensitive film and the coactive area of the finger.

Reference is now made to FIG. 1 of the drawing which illustrates one practical embodiment of the self-contained machine described in Alles, Ser. No. 189,891 filed Apr. 24, 1962 (U.S. Patent 3,128,498). In this figure and in the other figures of the drawing, similar reference numerals refer to similar parts throughout the several figures. In FIG. 1 the image-forming machine comprises a bedplate 10 which carries a relief printing form 11 on which is laid a pressure-clearable film 12. Fastened to the bedplate in any suitable manner are vertical supports 13 which carry guide rails 14 which extend along the sides of the bedplate. These guide rails are provided with suitable stop collars 15 which are fastened to guide rails by means of set screws 16. Slideably mounted on the guide rails is a transverse frame 17 having end plates 18 which are provided with suitable holes 19 that interfit with the guide rails. Extending between and fastened to the endplates are transverse rails 20 on which there are slideably mounted bearing supports 21. The inner surface of these bearing supports are provided with vertical grooves 22 which are adapted to receive transverse support block or member 23. The bottom surface of this support block is provided with a row of spring fingers 24 which are attached to the support block by means of a fastening plate 25 which is held in position by suitable screws 26. While for simplicity, the machine is illustrated with a double row of off-set fingers 24, it is obvious that a single row or multiple rows of larger number might be employed.

While the contacting area of the spring fingers, i.e., the spherical surface on the spring fingers, may vary in size, surfaces having radii of about .008 to .016 inch are desirable sizes, because these sizes will clarify a .002 to .003 inch width of line and the smaller characters on most relief printing forms are approximately .003 inch in their smallest dimension. The loading on the spring fingers depends upon the characteristics of the opaque, pressure-clearable film. The load required to clarify a typical such film having a pressure-clarifiable layer of about 0.0005 inch on a .002 inch polyethylene terephthalate base using a .019 inch radius spherical surface, is approximately 90 grams in weight. This load will produce substantially minimum optical density. The spring fingers are prestressed to obtain pressure sufficient for clarification; and the depth of penetration below average type height is controlled. On a typical relief printing form, average type height is 0.918 inch ±.003 inch; and, conveniently, the penetration of the fingers should be from .010 inch to .005 inch below average type height for satisfactory operation.

The transverse rails are provided with springs 31 which surround the rails and press against the inner face of the bearing supports and suitable collars 32 that are fastened to the transverse rails by set screws 33.

As shown in FIG. 1 and in FIG. 2, ratchet wheel 34 is disposed near one end of the transverse frame between endplate 18 and the bearing support 21. This ratchet wheel has affixed thereto a suitable indexing shaft 35, the inner of which is threaded for threadable engagement with the bearing support 21. The transverse support block 23 is free to move laterally within the limits of the threaded indexing shaft travel. The opposite end of this shaft is smooth and extends through the endplate 18. A crank wheel 35' is suitably fastened to the outer end of the shaft. The crank wheel in turn is provided with a suitable crank handle 36. Between the ratchet wheel and the inner suface of the endplate and pivotally mounted on the shaft is a cam arm 37. Pivotally mounted on this cam arm is a pawl 38, the end of which engages the ratchet wheel. The other end of this pawl has mounted thereon a spring pintle 39. A similar pintle 40 is fastened to the cam arm and mounted on these pintles is spring 41. The outer end of the cam arm has a lateral extension 42 on which is fastened a pintle 43 on which there is journalled a cam follower 44. This roller is adapted to engage with the surfaces of cams 45 which are adjustably mounted on the bed plate in any suitable manner. These cams are disposed in a longitudinal channel 46 in the bedplate. The cams can be fastened in this channel in any suitable manner, for example, by means of threaded bolts (not shown) which extend through the adjusting slots 47.

In operating the machine, the printing form 11 is placed on the bedplate and, if necessary, fastened to it by any suitable means. The pressure-clearable film is then laid over the relief surface of the printing form with the pressure-clearable stratum in contact with the relief. The pressure-clearable film can be taped to the printing form or to the bedplate by means of any suitable pressure-sensitive sealing tape. Alternatively, the film to be used can be held in place against the relief by vacuum; for example, a vacuum frame 48 having a suitable sealing gasket 49 can be placed around the printing block. A protective sheet 50 can then be placed over the vacuum frame but is not essential with films having an impervious support. Air can then be withdrawn in the space between the vacuum frame, the printing block and the film or the protective cover sheet in any suitable manner, e.g., by providing suitable connecting passages and hoses or conduits connected to a vacuum pump.

The spring fingers are then adjusted to the desired height, so that the bottom actuating surface presses against the pressure-clearable film or protective sheet with the desired amount of pressure. This may vary somewhat depending on the nature of the surface of the relief. It may differ with halftones and line or type matter.

The transverse frame is then actuated to and fro on the guide rails either manually or by mechanical reciprocating means. As the transverse frame and associated mechanism is reciprocated, the bottom surfaces of the spring fingers will have a stroking action on the pressure-clearable film. The frame can be actuated by hand or can be actuated automatically by means of hydraulic cylinders or reversible motors suitably connected to the frame, e.g., by a loop chain drive, so that it can be reciprocated back and forth along the guide rails.

At the end of each stroke, the cam follower will engage the respective cam to actuate the pawl device and ratchet wheel and thereby move or index the indexing shaft and transverse support block laterally.

Alternatively, one of the cams can be removed so that the transverse support block can be moved only after a complete double movement of the transverse frame.

The initial position of the transverse support block can be adjusted by turning the crank by means of the crank handle 36.

An improved machine which differs from the basic machine described above in that the support block for the spring fingers is pivotally mounted so that it can be tilted from its normal longitudinal vertical axis, such that one row of the spring fingers is raised from operative contact is described in Alles, Ser. No. 257,053, filed Feb. 5, 1963 (U.S. Patent 3,128,497). This improved machine operates in two cycles, a tacking cycle, i.e., light pressure is applied initially to produce a low degree of embossing, and then the clarification cycle.

The process of the present invention can be used with this improved machine as well as the basic machine of S.N. 189,891 (U.S. Patent 3,128,498).

To further understand the invention, FIG. 3 and FIG. 4, illustrate progressive steps in the clarification of an opaque-pressure clearable stratum on a suitable support. In these figures, for ease of explanation and illustration, the fingers and stratum are being used to reproduce a planar surface rather than a relief surface.

In FIG. 3, 51 is the tracing or clarified area in the film produced by the initial stroke of finger 1, while 52 represents the initial tracing of an adjacent finger, finger 2. The distance between the adjacent fingers (S) is the designed spacing of the fingers and this distance is known or can be measured. The distance X is the distance between consecutive strokes of the same finger. This distance is dependent upon the lateral adjustment of the transverse support block 23. In FIG. 3, 51, 53 and 54 represent the consecutive strokes, respectfully, of a finger that is indexed such that consecutive strokes of the finger do not overlap. If the straight forward indexing such as described in Alles, Ser. No. 189,891, filed Apr. 24, 1962 and Alles, Ser. No. 257,053 filed Feb. 5, 1963, were used, finger 1 would consecutively make the tracings indicated by 54, 55, and 56. In this system of indexing, each subsequent stroke or tracing of the finger overlaps the previous stroke, until the distance S has been travelled and the stratum clarified.

FIG. 4 illustrates a section of the film that has been clarified except for narrow edge portions. In this figure, D represents the distance between adjacent strokes in the clarified portion.

The process of this invention minimizes the streaking problem when reproducing halftones by clarifying the stratum at a number of non-overlapping locations between the initial set of linear traces, prior to clarifying the entire area. The exact reason this process solves the problem is unknown, but is thought that this pattern of increasing the distance between successive strokes reduces the cumulative effect on the film of the sidewise thrust of the fingers produced when the fingers stroke in a straight forward manner. In the straight forward indexing, after an initial pass of the fingers, the stratum would be tacked to the relief or planar surface in a series of parallel lines with spacings equal to the spacing between fingers (S), e.g., tracings 51 and 52 in FIG. 3. The fingers were then indexed laterally for a distance a little less than the width of the clarified trace and another pass made; this was repeated until all the area (S) was covered. During this operation, it appears that after the initial tracing an unbalanced force was generated at each subsequent clarification pass because one side of the tracing the finger was then making had already been clarified. It is thought that this unbalanced lateral force, as shown in FIG. 7, would shift the nonclarified portion of the stratum a small distance in the direction of indexing as the clarification cycle proceeded. Due to this lateral shifting and slight progressive stretching of the film, the portion of the unclarified film 70 adjacent the initial tracing of the neighboring finger 69 buckles away from the printing form as the finger approaches the last few clarification strokes. The buckling occurs since the film can no longer slip or freely move in the direction of indexing as the adjacent portions 69 of the film have previously been tacked to the printing form by the neighboring finger. Then as the finger strokes the buckled portion 70, the film moves slightly but freely in the direction of indexing, i.e. perpendicular to the line of finger travel. This movement causes the halftone dots of the relief to be reproduced as distorted circles in the stratum, thus creating a streak.

FIG. 5 is a table representing experimental data that illustrates that for fingers having a tracing or clarification width of .002–.003 inch, spaced 60 mils apart, the tendency toward highlight streaking is inversely related to the distance between successive strokes and is reduced as the distance between consecutive strokes is increased. However, the improvement obtained by increasing X beyond five times the distance between adjacent strokes for these particular fingers, is hardly discernible.

In using the fingers described in the Alles patent applications that have a tracing width of .002 to .003 inch, it is obvious that D, the distance between adjacent strokes in the finally clarified film, cannot exceed .002 inch, otherwise uniform clarification cannot be obtained. Thus, the process of the invention requires that the indexing means space the distance between the successive strokes of a finger more than .002–.003 inch apart and also provide for complete coverage of the stratum by clarifying the skipped distance with the same or other fingers.

This can be accomplished by designing the indexing means to move in one direction such that the action of the fingers interlace, i.e., finger 1 will index across distance S and then continue to index across the unclarified areas between the prior strokes of finger 2 and finger 3, etc. until complete coverage is obtained. This method requires the accurate interlacing of the tracing of several fingers. Another method would be to have the fingers index in a reciprocating manner until the complete area is covered.

The method of using a unidirectional indexing motion with interlacing finger action can be called "skip indexing" for convenience. In "skip indexing" the basic idea is to have each subsequent stroke of a finger act on the stratum a distance X away from the previous stroke of that finger, the distance X remaining the same for all subsequent strokes and being greater than the distance D between adjacent strokes in the completed conversion. Since this method involves interaction of adjacent fingers and requires uniform stroke spacing in the completed conversion, accurate finger spacing and indexer design are necessary.

In use of skip indexing, since the strokes of several fingers can be interlaced over a width equal to three to four finger spacings, if the finger spacings S vary, the uniformity of the scribed lines will be affected. The finger spacing is dependent upon the dimensional accuracy of their manufacture, and it is desirable to have variations of less than .0005 inch in the space between the active area of the fingers.

The lateral movement of the fingers is dependent upon the parameters of the indexing shaft 26 and the ratchet 34 and pawl device. To design the ratchet wheel for skip indexing the following equations were developed.

(1) $$Y = \frac{S}{X}$$

wherein Y is the number of advances one finger must make to traverse the distance between adjacent fingers.

(2) $$Y = Z \pm \frac{1}{N}$$

wherein Z is an integer approximating $S/X$; several values of Z should be used in calculating the skip indexer design so that the case corresponding most closely to an integral number for T (see below) is selected. N is the number of integral finger spacing widths each finger must travel for complete clarification.

$$(3) \qquad D = \frac{S}{ZN}$$

$$(4) \qquad T = \frac{P}{X}$$

wherein P is the pitch of the indexing shaft, or screw advance in inches per revolution and T equals the number of advances per revolution of the ratchet wheel.

In a sample calculation involving fingers that are spaced 0.0672 inch apart, S equaling 0.0672. If P equals 0.100 inch, and an arbitrary skip distance of 0.0043 inch is chosen, then Z will be approximately 15 or 16. Let D equal 0.015 inch this is an arbitrary choice that is dependent upon the width of the tracings produced by the finger, i.e., assume .002 to .003 inch for this calculation. N is defined by substituting the values for S, D and Z into Equation 3 and the result that N equals three finger widths. This could be more or less, depending upon the time factor and optical density required for final clarification, i.e., it is dependent upon the value selected for D.

Thus, when Z=16, Y will equal 15⅔ or 16⅓, and substituting this value of Y into Equation 1 the result is that X equals 0.004289 or 0.004114 and T would equal 23.31 or 24.31. 2T which is design of a ratchet having T teeth, but indexed 2 teeth at each end of the transverse support block travel would be 46.62 or 48.62 and 3T would be 69.93 or 72.93. Since 3T is very close to a whole number, a ratchet with 70 teeth could be used with very little spacing error due to ratchet design. Then if this ratchet is indexed 3 teeth at a time, turning the indexing shaft the equivalent of three teeth (15.4°) at each end of carriage travel, there will be 0.00428 inch skip indexing and complete coverage of the film during the time it takes each finger to travel 3 finger widths.

To apply this calculation to the machine of FIG. 1 and FIG. 2, the ratchet 34 would be machined to have 70 teeth and the indexing shaft 26 and the bored hole in the bearing support 21 would be threaded so that the advance of the bearing support and transverse support block 23 would be 0.100 inch per shaft revolution. The cam follower 44 and cams 45 would be designed so that the pawl 38 would engage every third tooth on the ratchet. Thus in operation, as the transverse support block 23 travels back and forth, it is indexed laterally at the point of travel reversal by an amount equal to the "skip" distance. The indexing can be accomplished on both the tack down and the clarification cycles.

If desired, in the indexing process, the travel of each finger can be confined so that it does not overlap its neighbor, i.e., restrict widthwise travel of one finger to the distance S. This requires reciprocating motion and can be achieved mechanically by use of a special indexing mechanism and special indexing ratchet such as shown in FIG. 6. In using this mechanism each finger skips back and forth within its finger width to completely clarify the stratum and does not intertrace the tracing of other fingers.

This indexer used a square toothed indexing ratchet 57 and three indexing pawls 58, 59 and 60 of different length instead of the ratchet 34 and pawl 38 of the basic machine. Each of the pawls are sequentially engaged with the ratched for about ⅔ of a revolution so that the indexing shaft 26 on which the ratchet is mounted, rotates back and forth three times on itself for ⅔ of a revolution each time.

The pawls are controlled by an escapement wheel 61 which rotates 90° as the pins 62 and 62′ mounted on the ratchet strike the lever 63, pivotally mounted on pawl 59. The cycle is started by cocking the ratchet wheel to the right to a stop position. Pawl 58 drops into working position when the spring loaded escapement wheel 61 is cocked to the start position, i.e., the lever 63 in conjunction with one of the three stops 64a, 64b and 64c on the escapement wheel, lock the wheel. Stops 64a and 64c are located inwardly from the periphery. Stop 64b is located near the periphery of wheel 61. As the transverse support block 23 traverses back and forth, the ratchet rotates to the right one tooth spacing at each reversal, until pin 62 trips lever 63 allowing the escapement wheel to rotate 90°. The end of lever 63 is offset so that the stops may pass under it when the escapement wheel rotates. Pawl 58 is raised as its follower rides out of the slot 66 in the escapement shaft 65. At the same time the follower of pawl 59 drops into a slot on the shaft 65 that is at the same location as slot 66 but laterally displaced, and pawl 59 becomes active. When pin 62′ strikes lever 63, pawl 60 becomes active by dropping into slot 67, and the direction of indexing is again reversed. The activation of the escapement by pin 62 and 62′ must occur within ⅓ of a tooth spacing so that the pawl will not miss a tooth at the reversal point.

The escapement wheels, pawls and shaft are mounted on arm 68 that is pivoted around the indexing shaft 26 to swing back and forth through an approximate arc of 15° at each support block reversal.

With this method, if the skip indexing is 4.255 mils at each index, and there is a finger spacing of 0.0672 inch, due to the difference in pawl lengths, the ratchet will be offset by ⅓ of a tooth at reversal so that on completion of the cycle, each finger will complete 48 strokes within one finger, width and all will be evenly spaced at 1.43 mils.

Another method of eliminating the high-light streaking consists of indexing the fingers one-half of a finger space on the second stroke and on each subsequent stroke the fingers are indexed to halve the distance between previous lines, so that the finger spacing is split into halves, quarters, eighths, sixteenths, etc. until the film is completely clarified. This method has the advantage in that the force applied to the film is balanced during most of the clarification. This method, like "skip indexing" is used on both the tack and clarification cycles. Other variations are possible, such as dividing the area into thirds, quarters, etc.: but on the basis of mechanical simplicity the above method is preferred.

The process of the invention is not only applicable to the basic machine heretofore described, but also to its modified or improved embodiments. Thus it can be used with the modified machine described in Alles, Ser. No. 189,891, filed Apr. 24, 1962, U.S. Patent 3,128,498, wherein the bedplate reciprocates back and forth while the transverse support back remains stationary.

The various structural parts of the machines described can be made of conventional materials of construction. For most of the members and parts, steel, steel alloys, brass, aluminum, aluminum alloys, and high strength plastics, e.g., polyacetal resins, glass fibre laminates, nylon, etc., may be employed. For the spring fingers, it is preferred to use hardened beryllium copper, but Phosphor bronze, spring steel, etc. may be employed. The wearing surface of the fingers may be plated or coated with hard, abrasion-resistant material, e.g., chromium, rhodium, tungsten carbide, stellite, etc. The base plate, bearing blocks, corner supporting members and transverse blocks, etc., can be made of cast iron or die cast aluminum.

All types of opaque pressure-clearable films can be used in the apparatus of this invention. As previously stated, some suitable pressure-clearable films are described in Bechtold U.S. Patent 2,957,791. Other useful supported and unsupported pressure-clearable films are described in U.S. Patents 2,846,727, 2,848,752, Belgian Patent No. 599,353, and U.S. patent application, Stevenson, Ser. No. 176,134, filed Feb. 27, 1962.

The opaque, pressure-clearable films described in Bechtold U.S. Patent 2,957,791 and in the Bechtold patents referred to therein, have also been called opaque, pressure-clarifiable or pressure-coalescible films, but are more aptly termed opaque, pressure-clearable films since the opaque areas which are highly opaque are converted by means of pressure into clear areas readily transparent to visible light. The films are also clearable by heat and by heat and pressure.

The pressure-clearable film or coatings of the Bechtold patents which constitute preferred materials for use in this invention are porous, opaque, non-fibrous, of low bulk density and are composed of partially coalesced discrete particles of a hydrophobic organic addition polymer having a wholly carbon chain, a molecular weight of at least 10,000 and being taken from the group consisting of vinyl and vinylidene addition polymers, said film having an open-cell structure characterized by microscopic voids communicating with the surface and containing 20% to 80% by volume of open-cell pores, said film having a permeability to water vapor of at least 10 times greater than that of corresponding non-porous films of the same polymer and thickness, the opacity per unit of thickness being such that a film thickness of 3-mils and greater has a light-transmission of less than 10% at 4000 A., and increased light transmission at longer wavelengths of light, said film being capable of sustaining a permanent reduction in thickness of at least 20% together with substantial clarification of opaqueness under a pressure of 10,000 pounds per square inch at room temperature. These films are more fully described and defined in Bechtold U.S. Patent 2,957,791 which constitutes part of this disclosure.

After the clarified, or clear, images are formed in the opaque, pressure-clearable films by using the machines of this invention, the opaque background areas can be increased in optical density by deposition of opaque material in such areas to provide a high-contrast image-bearing layer. These areas being porous are readily coated or impregnated with colorants which fill the open cell voids. Any of the post-densification procedures described in Belgian Patent No. 599,353 can be used. Thus, the selectively clarified coating can be post-densified in unchanged opaque background areas by in situ deposition of lead sulfide at 50° C. by immersing the coating in aqueous lead nitrate and sodium sulfide solutions with intermediate blotting with porous cardboard, washing in water and drying which gives a dense, black background. Alternatively, the background areas can be post-densified by dyeing for several minutes with 2.5% aqueous solution of an after-chromed dye, Colour Index No. 15,710, at 50° C. for several minutes.

The invention has the advantage that it produces a clear and transparent image when a printing form is reproduced with pressure clearable film and it is particularly advantageous when forming a clear image of a halftone printing form or plate.

The invention also has the advantage that it substantially removes or eliminates the highlight dot streaks with apparatus that are simple in construction and dependable in operation.

What is claimed is:

1. In a process for forming clear images in an opaque, pressure-clearable film by maintaining in contact with the relief surface of a printing form the pressure-sensitive surface of a thin, flexible sheet embodying a stratum of opaque pressure-clearable material while subjecting the opposite surface of the sheet simultaneously to a unit of equally spaced linear pressure strokes of narrow width to form a unit of spaced pressure traces, and consecutively applying the unit of strokes to form a new unit of traces adjacent to the first unit of pressure traces until the entire desired relief area has been subjected to at least one pressure stroke; the improvement characterized by shifting a plurality of times laterally in either direction the successive unit strokes so that the pressure traces are displaced from each other farther than the tracing width and then applying additional unit strokes to complete pressure tracing of the entire desired relief area.

2. An improved process according to claim 1 wherein the unit of pressure strokes is applied from two rows of pressure contact areas that are offset from each other so as to form interspaced pressure tracings.

3. In a process for forming clear images in an opaque, pressure-clearable film by maintaining in contact with the relief surface of a printing form the pressure-sensitive surface of a thin, flexible sheet embodying a stratum of opaque pressure-clearable material while subjecting the opposite surface of the sheet simultaneously to a unit of equally spaced pressure strokes from at least one row of yieldable fingers of small coactive area, to form a unit of pressure traces, the pressure traces being applied over the entire surface of said relief; the improvement characterized by shifting laterally a plurality of times the linear strokes on the sheet so that consecutive linear strokes of the individual fingers are essentially displaced from each other farther than the tracing width, and then shifting and applying additional unit strokes to complete pressure tracing of the entire desired relief area.

4. In a process as set forth in claim 1 wherein the stroking pressure is from two rows of yieldable fingers, the fingers in one row being offset from the fingers in the other row; the improvement characterized by laterally shifting a plurality of times the successive strokes so that the pressure traces are displaced from each other farther than the tracing width and then applyong addttiooal unit strokes to complete pressure tracing of the entire desired relief area.

5. An image-forming machine having
 (A) a bedplate adapted to support a relief printing form and an opaque, pressure-clearable film in contact with its relief surface,
 (B) a frame member mounted above and suspended across the bedpiate,
 (C) at least one row of yieldable fingers of small coactive area held by said frame member and adapted to contact with the upper surface of such a film and press the film against the relief surface of said form,
 (D) means providing relative motion between the bedplate and frame member to subject the film to a stroking pressure from said fingers during the motion, and
 (E) means for laterally adjusting the position of the yieldable fingers with respect to the relief form; characterized in that the last-mentioned means includes an indexing mechanism for indexing linear stroke motion between the bedplate and frame member so that the consecutive strokes are essentially shifted laterally from each other a distance farther than the tracing width.

References Cited
UNITED STATES PATENTS

| | | | |
|---|---|---|---|
| 2,957,791 | 10/1960 | Bechtold | 161—165 |
| 3,128,497 | 4/1964 | Alles | 18—1 |
| 3,128,498 | 4/1964 | Alles | 18—1 |
| 3,188,687 | 6/1965 | Blair | 18—1 |

WILLIAM J. STEPHENSON, *Primary Examiner.*